United States Patent
Nishiyama et al.

[11] Patent Number: 5,405,191
[45] Date of Patent: Apr. 11, 1995

[54] BRAKE FLUID PRESSURE CONTROL DEVICE

[75] Inventors: Yukinori Nishiyama; Koji Takata, both of Itami, Japan

[73] Assignee: Sumitomo Electric Industries, Ltd., Osaka, Japan

[21] Appl. No.: 181,311

[22] Filed: Jan. 13, 1994

[30] Foreign Application Priority Data

Jan. 14, 1993 [JP] Japan ................. 5-000687 U

[51] Int. Cl.6 .................... B60T 8/32; B60T 8/48; B60T 8/58
[52] U.S. Cl. .................... 303/113.2; 303/116.1; 303/119.1; 303/900; 303/901
[58] Field of Search ............ 303/116.1, 116.2, 113.2, 303/113.3, 119.1, 900, 901, 115.5, 115.4, 116.3, 116.4, 119.2, 117.1

[56] References Cited

U.S. PATENT DOCUMENTS

| | | | |
|---|---|---|---|
| 4,892,362 | 1/1990 | Takata | 303/900 |
| 4,952,002 | 8/1990 | Arikawa et al. | 303/900 |
| 5,058,961 | 10/1991 | Mergenthaler et al. | 303/116.2 |
| 5,112,117 | 5/1992 | Altmann et al. | 303/116.1 |
| 5,143,428 | 9/1992 | Toda et al. | 303/900 |
| 5,152,589 | 10/1992 | Ocvirk | 303/900 |
| 5,213,399 | 5/1993 | Burgdorf et al. | 303/119.1 |
| 5,215,359 | 6/1993 | Burgdorf et al. | 303/116.2 X |
| 5,271,667 | 12/1993 | Takata et al. | 303/113.2 |
| 5,277,483 | 1/1994 | Yosida et al. | 303/113.2 |

FOREIGN PATENT DOCUMENTS

| | | | |
|---|---|---|---|
| 539899 | 5/1993 | European Pat. Off. | 303/113.2 |
| 4015664 | 11/1991 | Germany | 303/116.2 |
| 4205041 | 8/1992 | Germany | |
| 4202388 | 8/1993 | Germany | |
| 5116556 | 5/1993 | Japan | |

Primary Examiner—Douglas C. Butler
Attorney, Agent, or Firm—Wenderoth, Lind & Ponack

[57] ABSTRACT

A wheel brake fluid pressure control device has a main fluid line and a return-flow type antilock control function. This device also has a fluid supply line branching from the main fluid line so that it has a traction control function as well. It is necessary to provide such a device with a shutoff valve for checking the fluid flow from the fluid supply line to the discharged fluid reservoir while the master cylinder is being pressurized. The shutoff valve employed is not an expensive solenoid valve or a pressure-responsive valve, but a pressure-responsive type check valve which closes when the brake pressure in the discharge line exceeds a predetermined level. This shutoff valve is simple in structure and low in cost and can improve the reliability of the entire device. Also, by using this valve, the traction control function can be added to an existing antilock control device at a low cost.

1 Claim, 1 Drawing Sheet

BRAKE FLUID PRESSURE CONTROL DEVICE

BACKGROUND OF THE INVENTION

The present invention relates to a brake fluid pressure control device of simple structure and having the functions of both antilock and traction control.

The simplest anitlock device known is of the so-called recirculating type, which comprises a wheel brake fluid pressure control valve having a discharge valve and provided in a main fluid passage extending from the master cylinder to each wheel brake, a discharged fluid reservoir for temporarily storing the brake fluid discharged from the discharge valve, and a pump for pumping the brake fluid out of the discharged fluid reservoir and returning it to the main fluid passage. If it is desired to add traction a control function to this device, the structure of the entire device can be simplified effectively by using a circulation pump for the antilock function as a pressure source for the traction control.

In order to employ such a structure, brake fluid has to be supplied to the inlet port of the pump. This can be done in several known ways. These known ways are classified into two types. In one type, a fluid supply passage is provided so as to extend directly from the reservoir for the master cylinder to the pump inlet port. In the other type, the supply passage is provided to branch from the main passage connecting the master cylinder outlet port to each wheel brake. Of these two types, the latter is advantageous in view of easy mounting on a vehicle and the non-necessity of returning redundant brake fluid to the reservoir for the master cylinder through its inlet port.

The latter method, in which the fluid supply passage branches from the main fluid passage, requires a traction control changeover valve for checking fluid flow from the flow return point from the pump toward the master cylinder during traction control and a shutoff valve for checking fluid flow from the fluid supply passage toward the discharged fluid reservoir during normal braking (when the master cylinder pressure is applied). As the shutoff valve, a solenoid valve or a pressure-responsive valve is ordinarily used.

But a solenoid valve is not only relatively expensive, but also has a problem in that, if the valve were not returned to its inoperative position as soon as the brake pedal is depressed during traction control, the brake fluid in the master cylinder would flow into the discharged fluid reservoir, thereby making the brake pedal inoperative. In this state, the subsequent antilock control function may be lost, too. Thus, it is necessary to increase the reliability of the electric system, including a brake switch. This is costlier than it appears.

A pressure-responsive valve, which requires a cylinder/piston assembly for driving the valve body in response to the pressure, is never satisfactory in cost.

In order to solve these problems, the present applicant proposed in Unexamined Japanese Patent Publication 5-116556 a brake fluid pressure control device of the above-described type which is simple in structure and inexpensive. It has a shutoff valve in the form of a stroke-responsive type check valve which is operative to check the fluid flow from the fluid supply passage to the discharged fluid reservoir if the amount of brake fluid in the discharged fluid reservoir exceeds a predetermined level. In this arrangement, the piston for the discharged fluid reservoir, which is an indispensable part in this structure, is used to drive the valve body of the check valve.

Since the piston in the discharged fluid reservoir, which is an essential part in this structure, is used to actuate the stroke-responsive check valve, such a shutoff valve is fairly simple in structure and thus costs less. Because of its simple structure, it is more reliable in operation than solenoid valves or pressure-responsive valves. But the stroke-responsive check-valve disclosed in Unexamined Japanese Patent Publication 5-116556 has a problem in that it necessarily has to be installed in or near the discharged fluid reservoir. If it is desired to add the traction control function to only some of mass-produced antilock control devices originally having no traction control function by adding the stroke-responsive check valve, such devices have to be provided with an extra space for mounting the check valve near the discharged fluid reservoir when mass-producing them. This limits the freedom of layout and reduces the economic advantage.

SUMMARY OF THE INVENTION

It is therefore an object of the present invention to provide a brake fluid control device which is simple in structure and in which the shutoff valve can be installed at any desired location.

According to the present invention, a pressure-responsive check valve is used as the shutoff valve instead of a stroke-responsive check valve.

The pressure-responsive check valve serves as a shutoff valve only if it is provided somewhere in the fluid supply passage which extends from the main fluid passage to the discharged fluid reservoir. Since it can be mounted at any desired position in the fluid supply passage, the function of the device can be changed easily.

Further, it is preferable to provide an intermediate fluid reservoir at a suitable position so as to communicate with the fluid supply passage during the traction control mode. The intermediate fluid reservoir will serve as a brake fluid supply source which helps supply brake fluid to the circulation pump. This makes it possible to increase the brake pressure more quickly at the initial stage of traction control.

According to the present invention, the shutoff valve for checking the fluid flow from the fluid supply passage toward the discharged fluid reservoir while the master cylinder is being pressurized is in the form of a pressure-responsive check valve actuated in response to the fluid pressure in the discharge passage. Such a check valve can be installed at any desired position, and thus can be added economically to a device having only the antilock function if it is desired to add the traction control function to such a device. Thus, according to the present invention, a reliable multifunctional fluid pressure control device is obtainable at low cost.

BRIEF DESCRIPTION OF THE DRAWINGS

Other features and objects of the present invention will become apparent from the following description made with reference to the accompanying drawings, in which.

DETAILED DESCRIPTION OF THE EMBODIMENTS

Figure 1:
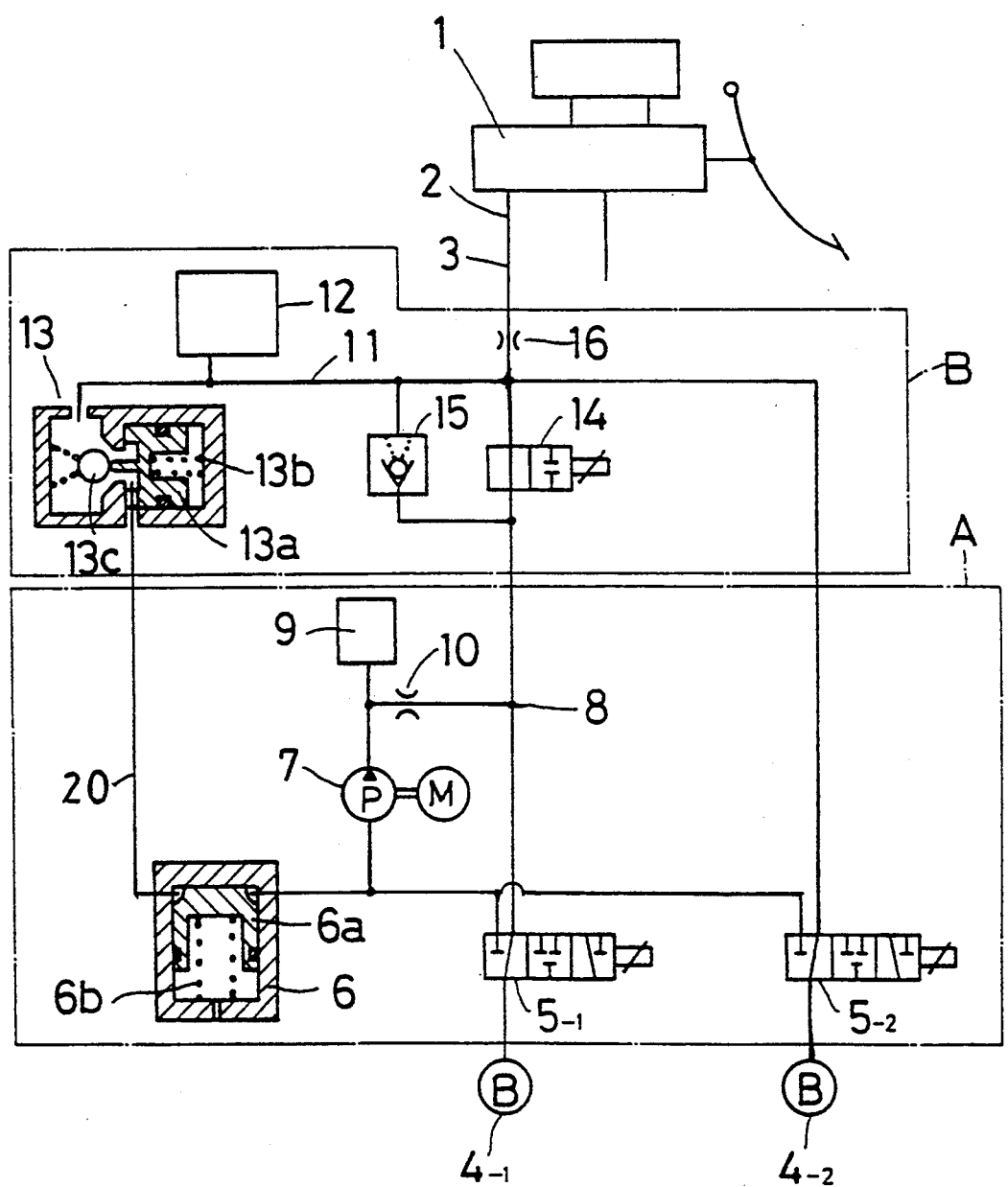
FIG. 1 is a circuit diagram showing a preferred embodiment of the device according to the present invention.

FIG. 1 shows an embodiment in which the main passage and the supply passage are normally in communication with each other and the traction control changeover valve is a two-port two-position valve provided between the point at which the supply passage branches from the main passage and the flow return point from the pump.

According to the present invention, there is no need to provide a shutoff valve for checking the fluid flow from the supply passage to the discharged fluid passage during a normal braking mode, near or in the discharged fluid passage. Thus, a conventional antilock control circuit A can acquire the traction control function as well as the antilock function simply by adding a fluid supply passage 11 and the traction control circuit B thereto. In other words, provided the antilock control circuit A has a discharge passage 20, the traction control function can be added to the device provided with only the antilock function simply by adding the traction control circuit B without the need for replacing a discharged fluid reservoir 6.

The following is the detailed description of the structure of FIG. 1.

A master cylinder 1 (a booster of any type may be attached thereto) has two outlet ports. We shall describe hereinafter only one of the two lines, because the same explanation is applicable to both lines.

Wheel brake fluid pressure control valves 5-1, 5-2 are provided in the respective main fluid passages connecting an outlet port 2 to wheel brakes 4-1, 4-2. The wheel brake fluid pressure control valves may be three-position type valves (as shown in FIG. 1) having pressure-increase, pressure-hold and pressure-decrease positions, or two-position type valves having no pressure-hold position. In many cases, a check valve (not shown) is added to each of the control valves in parallel therewith to allow the brake fluid pressure to drop quickly when the pressure on the brake pedal is relaxed during antilock control.

When the brake fluid pressure control valves 5-1 and 5-2 are in their discharge positions, the wheel brakes 4-1 and 4-2 are in communication with the discharged fluid reservoir 6 through the discharge passage 20.

A pump 7 pumps the brake fluid out of the discharged fluid reservoir 6 and returns it to a flow return point 8 of a main fluid passage 3. In order to prevent a pulsating flow of the fluid discharged from the pump 7, a buffer fluid reservoir 9 and a throttle 10 are used in combination.

Described above is the basic structure of a recirculating type antilock brake fluid pressure control device. In order to add a traction control function to this device, the following elements are added.

A supply passage 11 is provided which branches from the main fluid passage 3 at a point upstream of the flow return point 8. A pressure-responsive type check valve 13 is provided between the fluid supply passage 11 and the discharge passage 20 communicating with the discharged fluid reservoir 6 and the pump inlet.

Since the check valve 13 is activated in response to the pressure in the discharge passage 20, it can be designed to be simpler in structure and smaller in size than a pressure-responsive valve adapted to be activated in response to the pressure in the main fluid passage 3. Namely, if a valve body 13c in the check valve 13 is open when the pressures in the main fluid passage 3 and the fluid supply passage 11 have increased as a result of a braking operation, brake fluid will flow into the discharge passage 20. But since a spring 13b in the check valve 13 is set to be weaker than a spring 6b in the discharged fluid reservoir 6, a piston 13a in the check valve 13 will be moved due to the increased pressure in the passage 11 before the piston 6a in the discharged fluid reservoir 6 is moved, thereby moving the valve body 13c in the check valve 13 to a closed position where the fluid communication between the passages 11 and 20 is closed. Thus, brake fluid soon stops flowing into the discharge passage 20.

During the traction control mode, the fluid in the discharge passage 20 is drawn out by the pump 7, so that a negative pressure is produced in the passage 20. Due to the negative pressure, the piston 13a in the check valve 13 is pulled to the lefthand side in the figure, tending to move the valve body 13c toward its open position in cooperation with the force of the spring 13b. In this state, since the main fluid passage 3 and the fluid supply passage 11 are not pressurized, the valve body 13c will open, allowing the pump 7 to suck up brake fluid in the fluid supply passage 11 which communicates with an intermediate fluid reservoir 12 (described later), and to discharge it toward the flow return point 8.

A force that tends to open the valve body 13c in the check valve 13 will also act if the fluid in the discharged fluid reservoir 6 has been pumped out completely during the antilock control so that a negative pressure is produced in the discharge passage 20. But since the main fluid passage 3 and the fluid supply passage 11 are pressurized during antilock control mode, the valve body 13c cannot open, so that the pump will run idle under no load.

The critical pressure above which the valve body 13c can be opened is determined by the effective pressure-receiving area of the valve body 13c, the effective pressure-receiving area of the piston 13a, the frictional resistance of the piston 13a, the force of the spring 13b, and the pressure (negative pressure) in the discharge passage 20. If it is desired to decrease the critical pressure, the force of the spring 13b may be reduced. In some case, the spring may be omitted. It is possible, by omitting the spring 13b, to reduce the number of parts and the size of the entire device, which is desirable.

A traction control changeover valve 14 is provided between the flow return point 8 and the branching point to prevent the pressure fluid from flowing back into the master cylinder during the traction control mode. Further, in order to allow, exceptionally, such backflow in case the pump discharge pressure increases to an abnormal level, a high-pressure (maximum fluid pressure required for traction control: e.g. 60 barr) relief valve 15 may be provided in parallel with the changeover valve 14.

Further, in this embodiment, in order to further improve the performance of the device, there is provided an intermediate fluid reservoir 12 at such a point that it always communicates with the fluid supply passage 11. It may be a simple fluid chamber similar to the buffer fluid reservoir 9. But, for higher a fluid supply capacity to the pump, it should preferably be provided with a volume control means for reducing the volume of the intermediate fluid reservoir 12 when the internal fluid pressure tends to drop below atmospheric pressure, thereby keeping the internal pressure above the atmospheric pressure. The volume control means may be a diaphragm or a piston which has a slight self-restoring force and operates only under a difference between the internal pressure and the atmospheric pressure. With these means, it is fairly easy for the fluid reservoir to recover its original volume at the completion of traction control, before the brake fluid flows back into the master cylinder reservoir.

Also, by providing the intermediate fluid reservoir 12 at such a position that it communicates with the main fluid passage 3 even during antilock control, the pulsating flow from the pump during antilock can be further restrained. A throttle 16 may be added as long as it would not hinder the normal braking performance. It acts in cooperation with the intermediate fluid reservoir 12 to strengthen the buffering effect of the combination of the buffer fluid reservoir 9 and the throttle 10. This further reduces pulsation.

The wheel brake 4-2 and the brake fluid pressure control valve 5-2 at the non-driven wheel side may be connected to the line branching from the point downstream of the traction control changeover valve 14 in the same manner as the wheel brake 4-1 and the brake fluid pressure control valve 5-1 at the driven wheel side. But they should preferably be connected to a line branching from a point upstream of the valve 14 as shown. This is because with this arrangement, it is not necessary to keep the control valve 5-2 activated during traction control and the pressure on the non-driven wheel brakes can be increased instantly upon depression of the brake pedal.

If the pressure-responsive type check valve 13 is provided at the position shown in FIG. 1, the amount of fluid necessary for moving the piston 13a in the check valve 13 from its stroke end to the position in which the check valve is closed constitutes the initial dead stroke of the brake pedal. Thus, the piston stroke from the stroke end to the valve closing position should be as short as possible.

What is claimed is:

1. A brake fluid pressure control device, comprising:
    a master cylinder;
    a wheel brake;
    a main fluid passage extending from said master cylinder to said wheel brake;
    a wheel brake fluid pressure control valve provided in said main fluid passage, said wheel brake fluid pressure control valve comprising a discharge valve;
    a discharge passage connected with said wheel brake fluid pressure control valve;
    a discharged fluid reservoir connected with said discharge passage for temporarily storing brake fluid discharged from said discharge valve;
    a pump having an intake side connected with said discharge passage and an output side connected with said main fluid passage at a flow return point in said main fluid passage for pumping brake fluid out of said discharged fluid reservoir and returning brake fluid to said main fluid passage;
    a fluid supply passage branching from said main fluid passage at a point between said flow return point and said master cylinder;
    a traction control changeover valve in said main fluid passage between said flow return point and said point at which said fluid supply passage branches from said main fluid passage for checking fluid flow from said flow return toward said master cylinder during traction control; and
    a pressure-responsive check valve provided in said fluid supply passage and provided separately from but fluidly communicating with said discharged fluid reservoir and between said discharged fluid reservoir and said main fluid passage for checking fluid flow from said master cylinder to said discharged fluid reservoir through said fluid supply passage during an increase in brake fluid pressure in said master cylinder and for checking fluid flow from said fluid supply passage to said discharged fluid reservoir if the brake fluid pressure in said discharge passage exceeds a predetermined level.

* * * * *